(12) United States Patent
Nilsen

(10) Patent No.: US 6,254,020 B1
(45) Date of Patent: *Jul. 3, 2001

(54) DRIVE MECHANISM FOR A FISHING REEL

(75) Inventor: Douglas H. Nilsen, Long Beach, CA (US)

(73) Assignee: David C. Nilsen, Long Beach, CA (US); a part interest ( * ) Notice: Subject to any disclaimer, the term of this patent is extended or adjusted under 35 U.S.C. 154(b) by 0 days.

This patent is subject to a terminal disclaimer.

(21) Appl. No.: 09/538,110

(22) Filed: Mar. 29, 2000

Related U.S. Application Data

(63) Continuation of application No. 09/008,933, filed on Jan. 20, 1998, which is a continuation-in-part of application No. 08/818,763, filed on Mar. 14, 1997, now abandoned.

(51) Int. Cl.[7] .................. A01K 89/015; A01K 89/033
(52) U.S. Cl. ............................. 242/255; 242/271
(58) Field of Search ............................ 242/255, 257, 242/259, 263, 271

(56) References Cited

U.S. PATENT DOCUMENTS

| 283,496 | * | 8/1883 | Lang | 242/271 |
|---|---|---|---|---|
| 477,754 | * | 6/1892 | Greason | 242/271 |
| 1,295,754 | * | 2/1919 | Hudson | 242/259 |
| 1,542,403 | * | 6/1925 | Miles | 242/271 |
| 1,547,238 | * | 7/1925 | Russell et al. | 242/259 |
| 2,006,481 | * | 7/1935 | Russell | 242/263 |
| 2,150,088 | * | 3/1939 | White | 242/271 |
| 2,417,732 | * | 3/1947 | Bland et al. | 242/271 |
| 2,812,840 | * | 11/1957 | Winter et al. | 242/271 |
| 2,978,201 | * | 4/1961 | Polevoy | 242/271 |
| 3,089,663 | * | 5/1963 | Kirby, Sr. | 242/263 |
| 3,167,272 | * | 1/1965 | Frode | 242/271 |
| 3,233,846 | * | 2/1966 | Polevoy | 242/271 |
| 3,315,913 | * | 4/1967 | Grieten | 242/270 |
| 3,424,286 | * | 1/1969 | Otterbach et al. | 242/270 |
| 4,067,512 | * | 1/1978 | Nepote | 242/270 |
| 4,271,942 | * | 6/1981 | Ballendux | 242/271 |
| 4,560,118 | * | 12/1985 | Weber et al. | 242/270 |
| 4,566,655 | * | 1/1986 | Young | 242/270 |
| 4,742,974 | * | 5/1988 | Furomoto | 242/270 |

(List continued on next page.)

FOREIGN PATENT DOCUMENTS 925964 9/1961 (SE).

*Primary Examiner*—Emmanuel M. Marcelo
(74) *Attorney, Agent, or Firm*—Christie, Parker & Hale, LLP

(57) ABSTRACT

A dual speed fishing reel having a housing with a spool on a spool shaft, a driven gear on the spool shaft and having a low speed pinion and a high speed pinion, a drive shaft, a low speed drive gear for engaging the low speed pinion and a high speed drive gear for engaging the high speed pinion, with the drive gears carried on the drive shaft, with one of the drive gears fixed to the drive shaft for rotation by the drive shaft and with the other of the drive gears riding on the drive shaft independent of rotation of the drive shaft, with the high speed drive gear engageable with the low speed drive gear, and a gear shift for moving the low speed drive gear into and out of engagement with the high speed drive gear.

Also first and second braking surfaces on opposite ends of the spool, first and second brake pads for engaging the first and second braking surfaces, respectively, with the first brake pad mounted on the spool shaft for axial translation with the spool shaft, with the second brake pad mounted on the spool shaft with the spool shaft axially moveable relative to the second brake pad, and with the spool shaft translating to bring the first brake pad into braking engagement with the first braking surface and to bring the second braking surface into braking engagement with the second brake pad. In one embodiment the spool shaft rotates and in a second embodiment the spool shaft does not rotate.

6 Claims, 5 Drawing Sheets

U.S. PATENT DOCUMENTS

| | | | |
|---|---|---|---|
| 4,867,392 | * | 9/1989 | Sato .................................... 242/270 |
| 4,951,898 | * | 8/1990 | Sakaguchi ........................... 242/270 |
| 5,058,447 | * | 10/1991 | Ikuta ................................... 242/270 |
| 5,149,308 | * | 9/1992 | Nakamura et al. ................. 242/270 |
| 5,193,763 | * | 3/1993 | Sakaguchi ........................... 242/270 |
| 5,297,756 | * | 3/1994 | Ikuta ................................... 242/270 |
| 5,454,526 | * | 10/1995 | Kaneko ............................... 242/270 |
| 5,575,432 | * | 11/1996 | Baisch ................................. 242/270 |

* cited by examiner

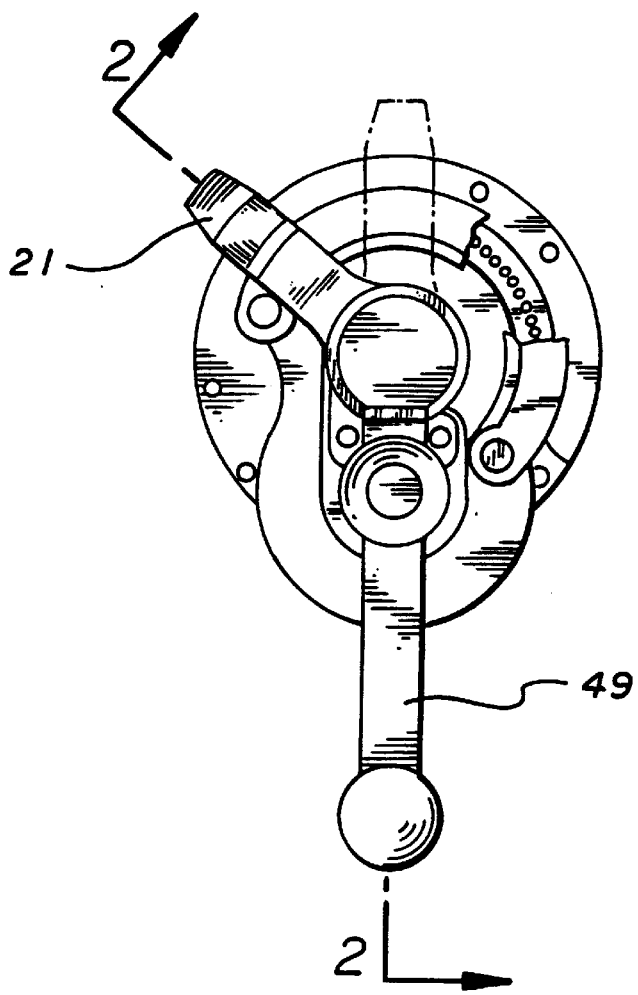
FIG. 1
FIG. 3
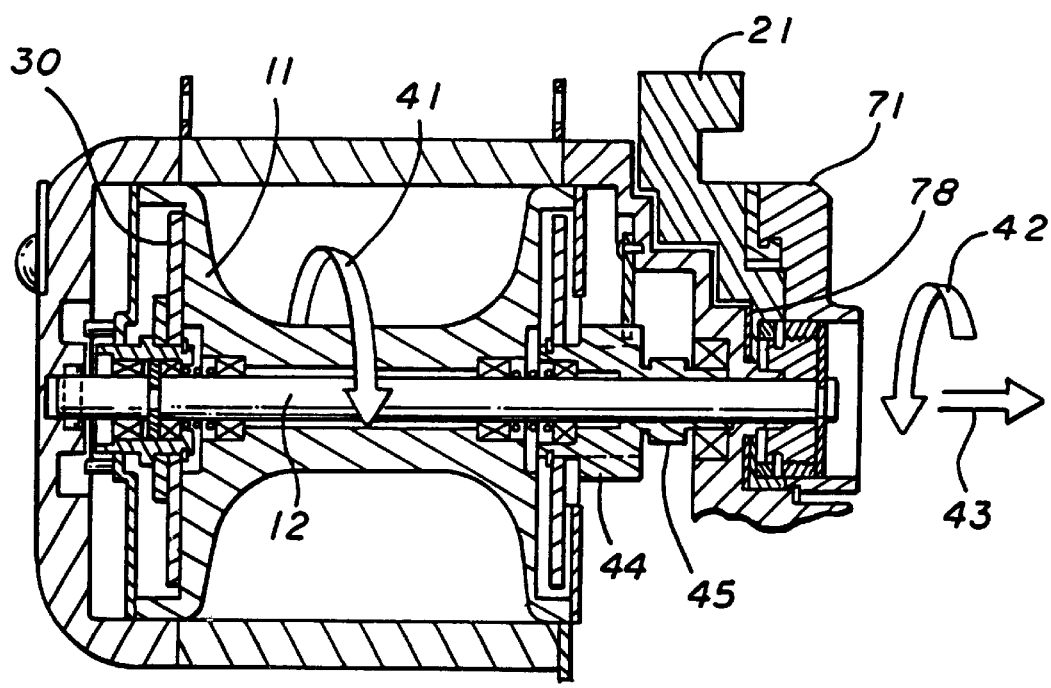

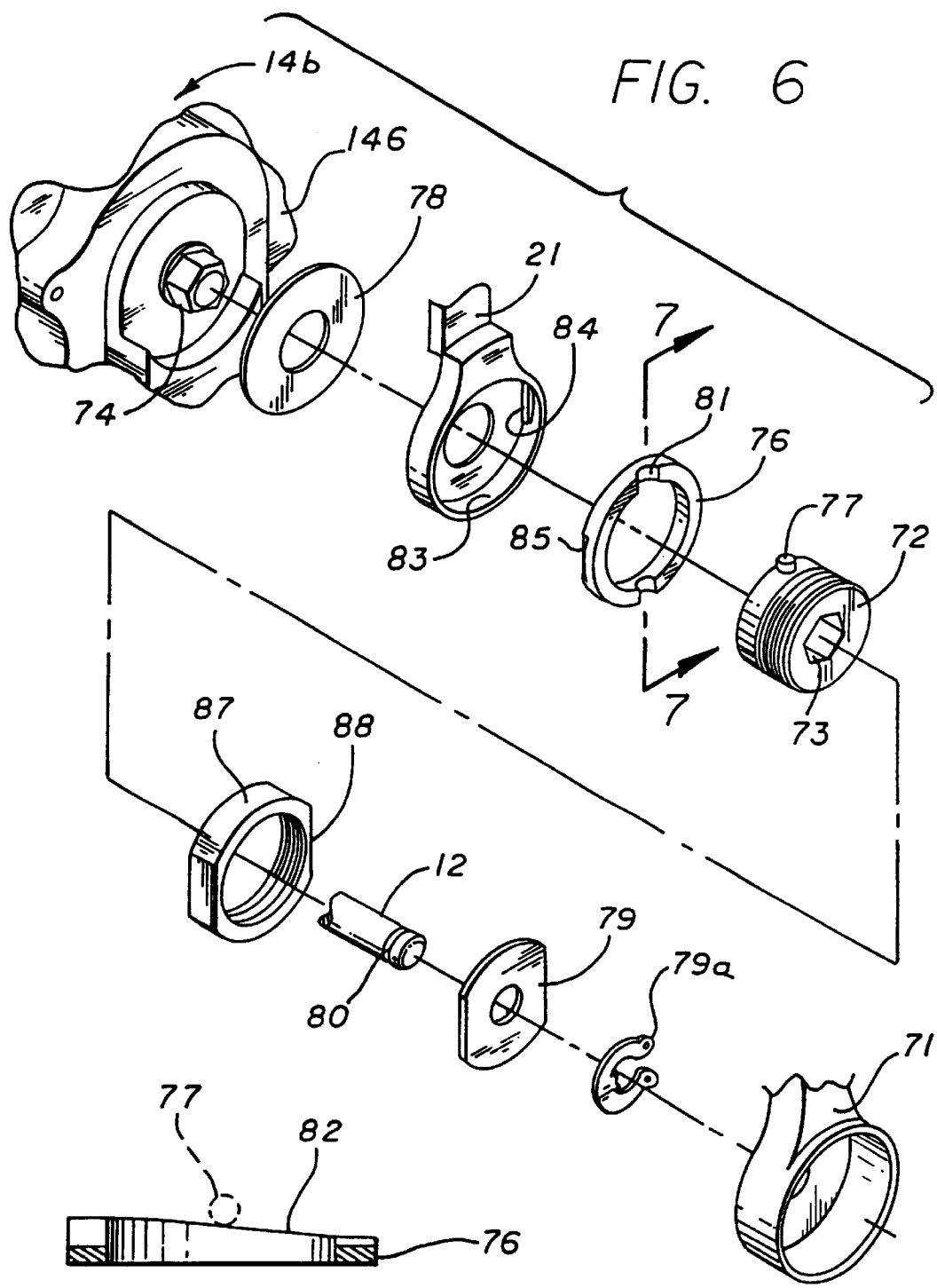

DRIVE MECHANISM FOR A FISHING REEL

CROSS-REFERENCE TO RELATED APPLICATION

The present application is a continuation of U.S. patent application Ser. No. 09/008,933, filed Jan. 20, 1998, the entire disclosure of such prior application is hereby incorporated herein by reference, and which is a continuation-in-part of U.S. patent application Ser. No. 08/818,763, filed Mar. 14, 1997, now abandoned.

BACKGROUND OF THE INVENTION

This invention relates to fishing reels and in particular to a two speed fishing reel with a new and improved shift mechanism for moving between a high speed operation and a low speed operation, and to a braking or drag system with new and improved braking operation.

Fishing reels with two speeds and some form of gear shifting and fishing reels with various drag constructions are well known. See for example U.S. Pat. Nos. 4,560,118; 4,867,392; 5,297,756; and 5,454,526.

In such prior designs when the braking or drag force is applied to one side of the spool, a significant torque load can be applied to the spool. Distortion problems occur when line is pulled on the side of the spool opposite the brake. This results in less braking efficiency and heating of the reel, with uneven and faster wear. Accordingly, it is an object of the present invention to provide a new and improved fishing reel with braking at both ends of the spool, while utilizing the conventional drag lever for operation by the fisherman to control the drag.

Earlier shift mechanisms in fishing reels have some problems with the quickness to change gears. One prior reel uses the movement of the whole handle mechanism from left to right to change gears. This can prove to be slow and difficult when the excitement of fishing is added into the equation. Another prior reel uses a push button to change to low gear. But the release button for switching back to high gear is in an awkward position. Also, it is an object of the present invention to provide a new and improved fishing reel with two speed shifting which overcomes these disadvantages.

Other objects, advantages, features and results will more fully appear in the course of the following description.

SUMMARY OF THE INVENTION

A dual speed fishing reel having a housing with a spool on a spool shaft, a driven gear on the spool shaft, the driven gear having a low speed pinion and a high speed pinion, and including means for engaging the spool in driving relation, a drive shaft, a low speed drive gear for engaging the low speed pinion and a high speed drive gear for engaging the high speed pinion, with the drive gears carried on the drive shaft, with one of the drive gears fixed to the drive shaft for rotation by the drive shaft and with the other of the drive gears riding on the drive shaft independent of rotation of the drive shaft, the high speed drive gear having means for engaging the low speed drive gear, and gear shift means for moving the low speed drive gear into and out of engagement with the high speed drive gear. The reel includes means for supporting the spool shaft in the housing for axial movement in the housing, with the driven gears sliding and rotating on the spool shaft.

The gear shift means more specifically includes a shift rod sliding axially between a low speed position and a high speed position, spring means for urging the shift rod to one of the positions, and latch means for latching the shift rod in the other of the positions, and including means for releasing the shift rod for movement by the spring means to the one position. Preferably the low speed gear is carried on the shift rod for translation with the shift rod into and out of driving engagement with the high speed gear, and the drive shaft and low speed gear include interengaging means for rotating the low speed gear with the drive shaft when the low speed gear is moved axially by the shift rod relative to the drive shaft.

The reel of the invention also may include first and second braking surfaces on opposite ends of the spool, first and second brake pads for engaging the first and second braking surfaces, respectively, means for mounting the first brake pad on the spool shaft for axial translation with the spool shaft, means for mounting the second brake pad on the spool shaft with the spool shaft axially moveable relative to the second brake pad, and means for translating the spool shaft to bring the first brake pad into braking engagement with the first braking surface of the spool and to bring the second braking surface of the spool into braking engagement with the second brake pad.

The braking arrangement more specifically includes a drag lever carried in the housing for actuation by the fisherman, a first cam member carried on the spool shaft for moving the spool shaft axially, and a second cam member carried on the drag lever for engagement with the first cam member, with the cam members engageable with each other for converting rotational motion of the drag lever into axial motion of the spool shaft for moving the brake pads in to and out of engagement with the spool braking surfaces.

The braking construction may also use compression springs on the spool shaft for equalizing axial loads. In one embodiment an anti-rotation pin on the spool shaft prevents shaft rotation while permitting shaft translation. A one-way roller clutch may be used between the spool shaft and one of the brake pads for permitting rotation of the brake pad in only one direction. An anti-reverse dog may be used with the other of the brake pads to permit rotation of the brake pad in only one direction. Two drag levers may be used for coarse and fine control of the braking action. In another embodiment the spool shaft rotates as well as translating, and the anti-rotation pin and roller clutch are omitted.

BRIEF DESCRIPTION OF THE DRAWINGS

FIG. 1 is an end view of a fishing reel incorporating the presently preferred embodiments of the invention;

FIG. 3 is a view similar to that of FIG. 2 showing the reel with one braking surface engaged;

FIG. 6 is an exploded view showing the camming surface which produce the translation of the spool shaft;

FIG. 7 is an enlarged sectional view taken along the line 7—7 of FIG. 6.

DESCRIPTION OF THE PREFERRED EMBODIMENTS

Figure 2:
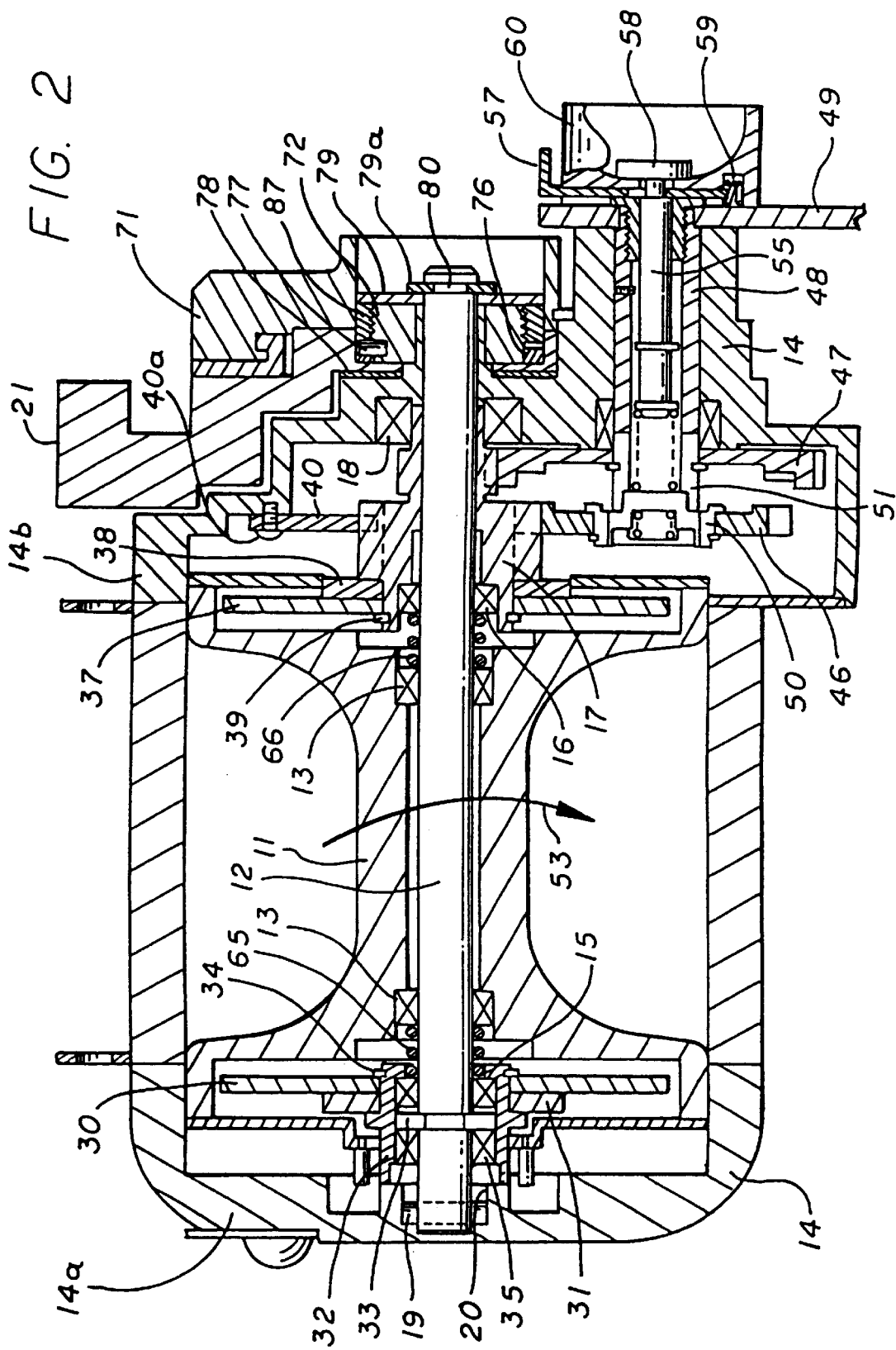
FIG. 2 is an enlarged sectional view taken along the line 2—2 of FIG. 1, incorporating a spool shaft which translates but does not rotate.

The fishing reel of the invention includes a spool 11 for the fishing line, with the spool carried on a spool shaft 12 in bearings 13 for rotation of the spool on the spool shaft. The spool shaft is mounted in a housing or cage 14 in a bearing 15 adjacent one end of the shaft and in a bearing 16 in a driven gear 17 which in turn is mounted in a bearing 18 in the housing. In this embodiment the spool shaft translates along the longitudinal axis of the spool shaft, but does not rotate in the housing. A pin 19 in the left end of the spool shaft 12 slides in a notch 20 in the housing end cap 14a to prevent rotation of the spool shaft.

A drag lever 21 is mounted on the housing for rotation relative to the housing for adjusting the drag on the fishing line carried on the spool. Rotation of the drag lever clockwise as viewed in FIG. 1 produces translation of the spool shaft 12 to the right as viewed in FIG. 2. This motion is accomplished by the construction shown in greater detail in FIGS. 6 and 7.

A brake pad 30 with a support plate 31 is carried on a sleeve 32 which rides on the bearing 15. A one-way roller clutch 35 is mounted on the spool shaft 12 in the sleeve 32 to permit rotation of the sleeve in only one direction.

A disc 33 is positioned between the bearing 15 and the roller clutch 25 and rides in a slot in the spool shaft 12. The brake pad and support plate are maintained in position on the sleeve between a shoulder of the sleeve and a snap ring 34.

A similar brake pad 37 with support plate 38 is mounted on the driven gear 17 and held in place by another snap ring 39. An anti-reverse dog 40 is carried in the other housing end cap 14b on a pin 40a. This dog engages the driven gear 17 to permit rotation of the sleeve in only one direction.

Figure 4:
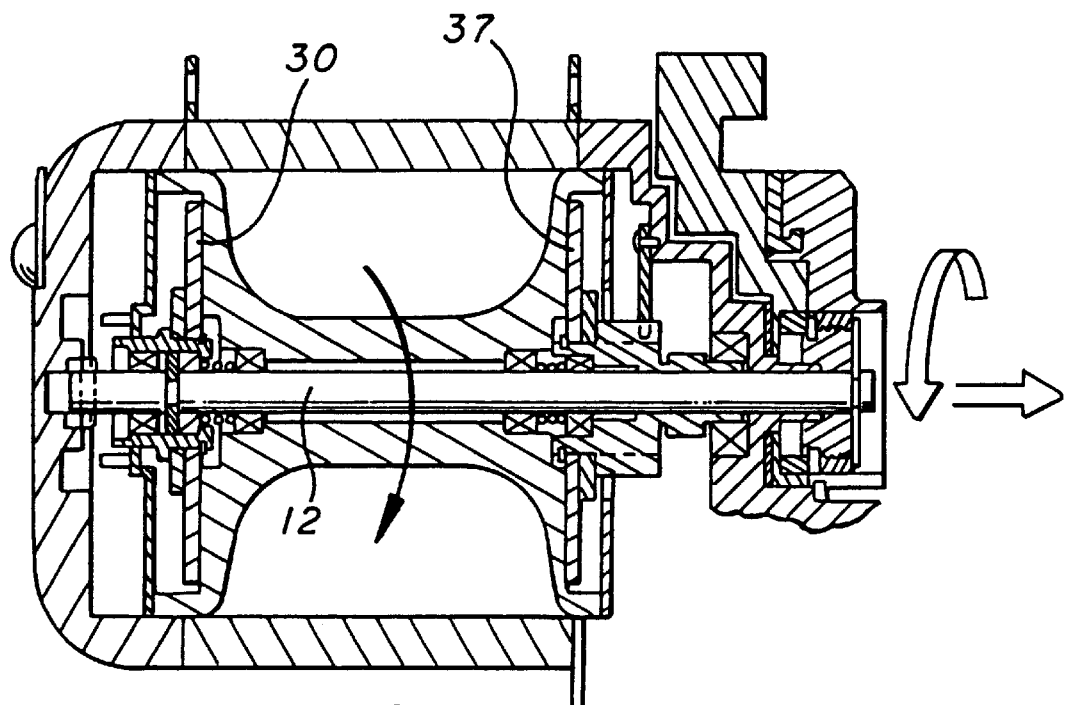
FIG. 4 is a view similar to that of FIG. 3 showing the reel with both braking surfaces engaged.

Translation of the spool shaft to the right from the position of FIG. 2 to the position of FIG. 3 brings the brake pad 30 into engagement with a braking surface of the spool 11. Translation of the spool shaft 12 to the right also moves the spool 11 to the right from the position of FIG. 3 to the position of FIG. 4, bringing another spool braking surface into engagement with the brake pad 37, the spool being moved to the right by the engagement of the brake pad 30 with the spool. Balancing compression springs 65 and 66 are positioned on the spool shaft 12 between bearings 13 and 15 adjacent one end of the spool and between bearings 13 and 16 adjacent the other end of the spool. With this arrangement, braking forces are applied at both ends of the spool on the line being unreeled off the spool by the fish, thereby achieving a balance of loads on the spool. With this dual braking configuration there is equal pressure on the spool from each side. This arrangement also reduces or eliminates distortion of the spool and of the reel housing when line is pulled off at either side of the spool.

When the fish is running line off the spool, the spool is rotating in the direction shown by the arrow 42 in FIG. 3. Moving the drag lever 21 clockwise as viewed in FIG. 1 and as shown by the arrow 42 in FIG. 3 causes the spool shaft 12 to move to the right as shown by the arrow 43. This increases the drag on the line. Conversely, moving the drag lever in the opposite direction reduces the force which moves the spool shaft to the left and therefore the braking force at the brake pads, and reduces the drag on the fishing line.

The mechanism for translating the spool shaft 12 by rotating the lever 21 is shown in FIGS. 6 and 7. A cam pin carrier 72 is mounted on the housing end cap 14b with a hexagonal opening 73 fitting on a hexagonal pin 74 of the end cap 14b.

An annular cam member 76 has a notch 81 for a cam pin 77 carried on the carrier 72. The cam member 76 has a varying thickness, as seen in FIG. 7, serving as a cam surface for engaging the pins 77. The cam member 76 fits in an opening 83 of the lever 21, with shoulders 84 of the lever engaging notches 85 of the cam member for rotation of the cam member by the lever. A washer 78 is positioned between the end cap 14b and the lever 21. The spool shaft 12 passes through the cam pin carrier 72, and the carrier bears against a retainer ring 79, with an E-clip 79a riding in a groove 80 of the shaft. Translation of the spool shaft is produced by rotation of the lever 21 which rotates the cam member 76 which translates the carrier 72 which translates the retainer 79 and the shaft 12 to the right, against the springs 65 and 66.

The lever 21 provides for fine adjustment of the drag. A second lever 71 may be used to provide for coarse adjustment of the drag. The lever 71 has internal flats (not shown), and a ring 87 with mating external flats 88 fits within the opening of the lever. The ring 87 has a threaded internal opening for positioning the ring as the threaded extension of the cam pin carrier 72. Rotation of the lever 71 produces axial translation of the cam pin carrier 72 and of the spool shaft 12.

Figure 8:
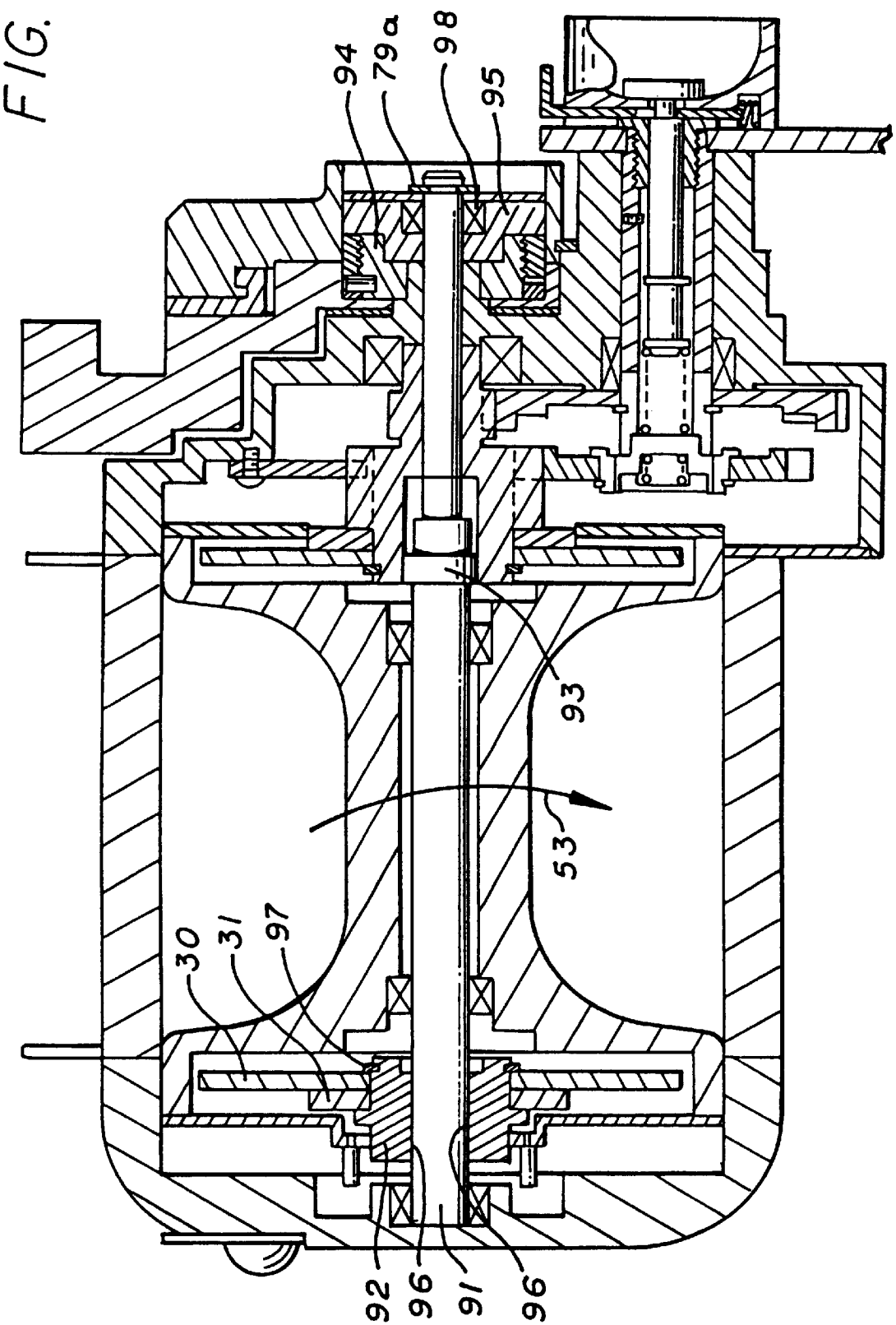
FIG. 8 is a view similar to that of FIG. 2 of another and presently preferred embodiment in which the spool shaft rotates and translates.

An alternative and presently preferred embodiment of the reel is shown n FIG. 8, where components corresponding to those of the embodiment of FIGS. 2–7 are identified by the same reference numerals. In this embodiment the spool shaft 91 rotates within the housing as well as translating. This embodiment includes a drag washer cap 92, a pinion gear bushing 93, a tension cam 94, and a tension cam washer 95. The shaft 91 has parallel flat surfaces 96 at the left end for slidingly receiving the drag washer cap 92, with a snap ring 97 in a groove in the cap 92 for holding the brake pad 30 and support plate 31 in place. A similar pair of flats are provided on the shaft 91 at the location of the pinion gear bushing 93, which has an internal opening for sliding onto the flats.

The tension cam 94 is substituted for the cam pin carrier 72, with the cam 94 also carrying the opposed pins 77. The tension cam washer 95 is added for supporting a bearing 98 for the end of the shaft 91. The roller clutch is omitted.

With the construction of FIG. 8, the shaft translates and functions in the same manner as does the shaft of the embodiment of FIGS. 2–7.

With the construction of the embodiment of FIG. 2, 100% brake pressure is applied when the fish pulls line off the reel. When the operator turns the handle to reel in the line, only 50% drag is asserted. This occurs because the roller clutch rolls forward when line is reeled in, while when line goes out, the roller clutch locks for more braking pressure. With the construction of the embodiment of FIG. 8, the shaft rotates with the left side of the drag also exerting pressure when the handle is cranked.

In the FIG. 8 embodiment the reel operates with the spool shaft rotating. When the fisherman wants to reel in a fish, he pushes the lever 21 clockwise. When the lever is moved the spool shaft 12 moves to the right sliding through pinion bushing 93 and the cam mechanism. This engages both braking pads against the spool. The fisherman then cranks the handle clockwise which then turns the spool 11 counterclockwise reeling the fish.

When the fisherman wants to unreel the fishing reel he must push the lever 21 counterclockwise which will release the spool shaft 12 to the left. This will release the brake pads 37 and 30 from the spool 11. The spool is now free to move clockwise to let line out of the reel. This reel is now in "free-spool". "Free-spool" is the condition when the spool has no pressure from the brake pads and can move clockwise or counterclockwise.

The driven gear 17 includes a low speed pinion 44 and a high speed pinion 45. The gear shift mechanism includes a low speed gear 46 and a high speed gear 47, with the low speed gear engageable with the low speed pinion and the high speed gear engageable with the high speed pinion. A drive shaft 48 is mounted in the housing 14 and is driven in rotation by a handle 49. The low speed gear 46 is carried on the drive shaft 48 by a fitting 50 which translates on the drive shaft in a slot 51. The high speed gear 47 is supported on the drive shaft 49 but rotates freely on the drive shaft.

In the condition shown in FIG. 2, with the low speed gear 46 engaging the low speed pinion 44, clockwise rotation of the handle 49 as viewed in FIG. 1, rotates the drive shaft 48 in the direction shown by the arrow 52 of FIG. 2 and rotates the spool 11 in the direction shown by the arrow 53, winding line onto the spool.

The low speed gear 46 with the fitting 50 is driven in rotation by the drive shaft 48. Also, the low speed gear and fitting are mounted on a shift rod or push rod 55 between a spring 53 and another spring 54. The spring 53 is positioned between the closed or left end of the drive shaft and the fitting 50, and the spring 54 is positioned between the fitting 50 and a snap ring 56 on the push rod 55. See FIG. 5.

Figure 5:
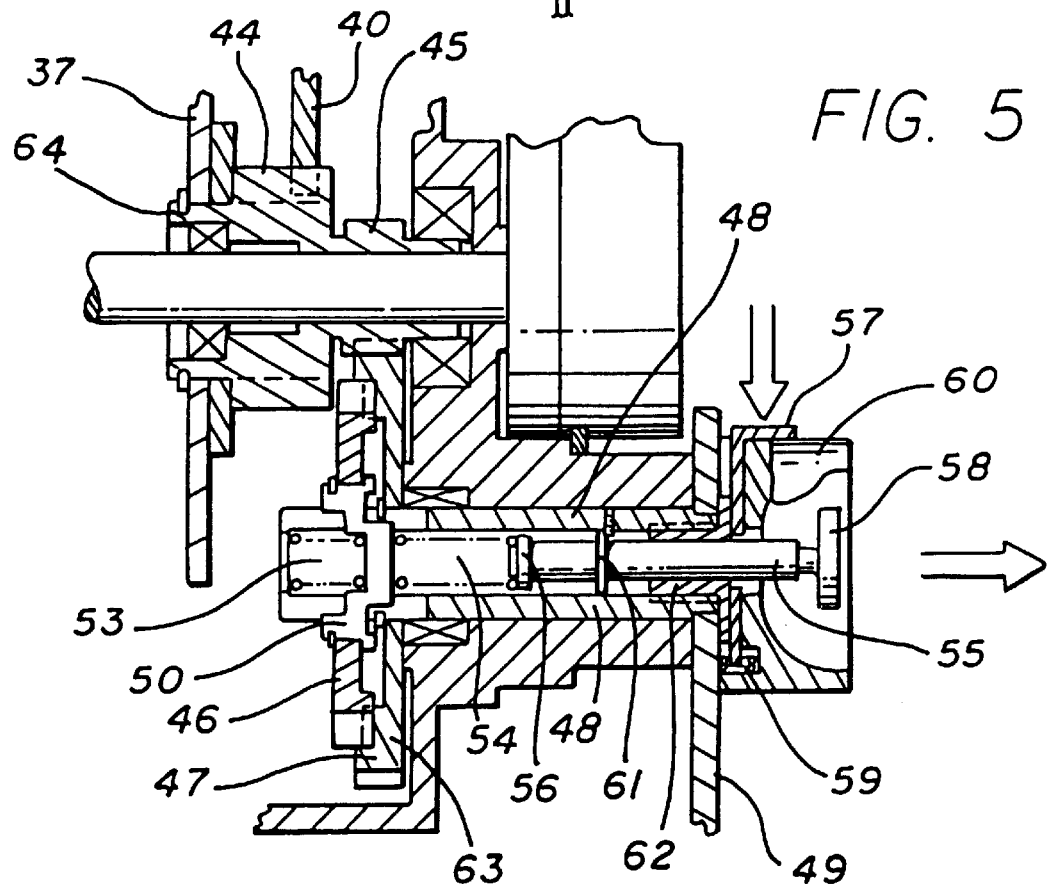
FIG. 5 is a partial view similar to that of FIG. 2 showing the reel with the low speed drive gear engaged for high speed operation.

The push rod 55 is maintained in the low speed position of FIG. 2 by engagement of a plate 57 with a notch or groove between the head 58 and the body of the push rod. A spring 59 carried in a shroud 60 positioned around the head 58 of the push rod urges the plate 57 to the up position as shown in FIG. 2. A downward push on the plate 57, as shown in FIG. 5, compresses the spring 59, moving the plate out of engagement with the push rod and permitting the spring 53 to move the push rod to the right as shown in FIG. 5. Another snap ring 61 on the push rod engages a screw in the drive shaft 48 to limit movement of the push rod to the right. Another screw 62 holds the handle 49 onto the drive shaft 48.

This movement to the right of the push rod pulls the low speed gear 46 out of engagement with the low speed pinion 44, and into engagement with an internal gear 63 formed in the high speed gear 45. This now permits driving of the high speed gear by the handle 49, the drive shaft 48 and the low speed gear 46 to rotate the driven gear through the high speed pinion 45.

Fingers 64 of the driven gear engage the brake pad 37 for rotating the brake pad and applying a rotational torque to the spool for winding line onto the spool.

When the operator desires to return to the low speed drive condition, the push rod is pushed to the left by pressure on the head 58 compressing the springs 54 and 53 and moving the low speed gear 46 out of engagement with the high speed gear 47, and into engagement with the low speed pinion 44. When the notch at the head 58 of the push rod moves inward to the position of the plate 57, the spring 48 moves the plate upward into engagement with the notch, holding the push rod in the low speed position of FIG. 2. Thus, it is seen that the gear shift mechanism can be operated by a simple push on the head 58 and a simple push on the plate 57 for shifting between high speed and low speed operations.

The shifting mechanism of the reel provides for very quick and positive gear changes. It also gives the user a low gear change by simply pushing the button. The high gear change is very easy because it is on the perimeter of the housing.

FIG. 3 is provided for illustrating the operation of the invention. However, in normal operation, the spool is centered between the brake pads 30 and 37 and the brake pads are engaged simultaneously.

I claim:

1. A drive mechanism for a fishing reel having a spool shaft, the drive mechanism comprising:

a driven gear carried on the spool shaft, the driven gear having a low speed pinion and a high speed pinion;

a drive shaft having an interior orifice along substantially the length of the drive shaft;

a low speed gear, rotationally affixed with the drive shaft, configured to engage the low speed pinion;

a high speed gear, freely rotatable on the drive shaft, configured to engage the high speed pinion, wherein the low speed gear is further configured to engage the high speed gear; and a gear shift mechanism configured to axially translate said low speed gear relative to the drive shaft into and out of engagement with the high speed gear.

2. The drive mechanism recited in claim 1, wherein the gear shift mechanism includes a first spring, disposed in the interior orifice, having one end stationarily affixed to the drive shaft and the other end configured to urge the low speed gear into engagement with the high speed gear.

3. The drive mechanism recited in claim 2 wherein the gear shift mechanism further includes:

a shift rod axially translatable in the interior orifice between a low speed position and a high speed position, the shift rod being in the high speed position when the low speed gear is in engagement with the high speed gear; and a second spring, disposed in the interior orifice, having one end abutting an end of the shift rod and the other end configured to urge the low speed gear out of engagement with the high speed gear when the shift rod is in the low speed position.

4. The drive mechanism recited in claim 3, wherein the gear shift mechanism further includes a latch mechanism configured to releasably latch the shift rod in the low speed position and to release the shift rod from the latched low speed position.

5. The drive mechanism recited in claim 4, wherein:

the shift rod has a groove formed therein;

the latch mechanism includes,
   a plate configured to engage the groove when the shift rod is in the low speed position, and
   a third spring configured to urge the plate into engagement with the groove.

6. The drive mechanism recited in claim 1, wherein:

the drive shaft includes a slot partially formed therein;

the low speed gear includes a fitting, axially translatable in the slot, configured to rotationally affix the low speed gear with the drive shaft and to axially translate the low speed gear relative to the drive shaft.

* * * * *